Patented Apr. 27, 1943

2,317,779

UNITED STATES PATENT OFFICE 2,317,779

MANUFACTURE OF PERMEABLE MATERIALS SUITABLE FOR USE AS SAUSAGE CASINGS

Owschia Lazar Janser, London, England, assignor to Mark Brainos, London, England No Drawing. Application December 18, 1939, Serial No. 309,918

4 Claims. (Cl. 117—60)

This invention relates to an improved process of producing permeable materials, more particularly sheets from which substitutes for animal sausage casings, such as beef middles and horse guts may be prepared. Materials of the character referred to are produced by way of an impregnation and suitable chemical treatment of paper, for example of paper made of unbleached or half-bleached sulphate kraft, unbleached sulphite cellulose, flax, linen, silk or any other strong fibrous materials, the object to be obtained by such treatment being to prevent the paper from crumbling when being subsequently treated with aqueous solutions, as described hereafter more in detail.

It has been proposed to treat the paper by immersing it into a solution of proteids; this process however yielded rather unsatisfactory results, and in order to speed up and to improve the impregnation or permeation of the paper it has further been proposed, to add a certain amount of alkali or an alkaline substance to the proteid solution, or to subject the paper to a pretreatment with dilute solutions of alkaline substances, or saponins, peptones, soaps, alcohols, prior to the immersion in the proteid solution, and to leave the paper treated in this manner in the proteid solution until a thorough saturation is attained by liquid exchange or displacement.

This process has likewise been objectionable, however, because the alkaline substances weakened the grain and washed out the necessary contents of resin of the paper. Peptones, saponins and soaps on the other hand only cause the proteid solution to produce such an amount of foam as to render the working process impracticable. Alcohols coagulate the proteids before an impregnation takes place.

The object of this present invention is to improve the processes heretofore known. The invention consists in a process of producing sheets of a permeable material which may be used for the manufacture of synthetic sausage casings and for any other suitable purpose where permeability and moisture resistancy are of concern. In general the process of the invention consists in thoroughly soaking or impregnating a strong and water resisting paper with a solution of sulfonated organic compounds, dipping same in an aqueous solution of suitable proteids, for example glue, and subjecting it thereafter to the action of a hardening agent.

In carrying out the invention paper of the type referred to is thoroughly soaked with a neutral dilute solution of sulphonated organic compounds such as are generally used as a wetting means in dyeing fabrics and yarn. A small amount of soda ash, not exceeding the balance of the natural alkaline earth salts contained in the water and therefore not altering the neutral reaction of the latter will help in getting a clear and efficient solution.

Sulfonated organic compounds, which may be used with advantage for the purposes of this invention are, for example:

(a) Condensation products of naphthalenesulfoacid and fat acids, (b) Condensation products of ethyl-sulfo-acid and aromatic compounds, (c) Sulfonated fat acids, (d) Sulfo-salts of estered fat acids.

After the treatment with these sulfonated organic compounds the wet paper is dipped into an aqueous solution of proteids, for example glue, gelatine, casein and the like, or mixtures thereof, for a period just sufficient for allowing to the proteid solution to adhere superficially to the wet paper. The material is then subjected to a treatment with hardening chemicals such as formaldehyde, alum, chromium salts etc. and afterwards dried.

The watery solution of sulfonated organic compounds contained within the paper dries more quickly than the water bound in the jelly-like outer layer of hardened proteids, thus producing a vacuum effect, whereby the outer layer is forced inwardly so as to produce a wholly transparent material, suitable for sausage casings in every respect. Glycerine or its substitutes such as ethylene glycol and the like will give the material a soft finish and prevent it, when handled, from cracking.

The necessary shape of tubes or hoses to be filled with ground meat, may be obtained (1) by simply overlapping the edges of the sticky sheets before treating them with the hardening chemicals, or (2) by means of a suitable water resisting adhesive, or (3) by sewing or by any other known or suitable means.

A slight percentage of rubber latex may be added to the proteid solution in order to increase the strength and pliability of the material and its resistance to boiling water. This latex may be used in its natural form or as vulcanised latex (so-called vultex), or natural latex may be mixed with a vulcanising accelerator and subjected to subsequent vulcanisation.

The use of an admixture of rubber latex to proteid solutions has already been proposed in connection with the manufacture of artificial string guts for tennis and badminton rackets and fishing lines from ends or threads of fibers, and no intimation as to its use for synthetic sausage casings made of paper and an impervious material in sheets has been given. On the other hand it has also been suggested to coat one side of cloth with proteid solution of such a viscosity as to prevent same from penetrating the cloth, without any mention of using paper as well.

The following example shows, how the invention may be carried into effect, it being of course understood, that this example is only of an illustrative and by no means of a limiting character.

A solution is prepared of three gallons of hot water, 1½ oz. soda ash and 1½ oz. of a sulfonated organic compound of the type referred to, the amount of soda ash varying with the percentage of lime and magnesia in the water. Sulphate kraft paper of a substance of 40 lbs. per ream 30" by 40" is thoroughly soaked with this solution and the excess of it allowed to drip off. 30 lbs. of sodium caseinate, hide glue etc. are dissolved in 6–8 gallons of warm water, 2–5 pints of liquid rubber latex in a natural or vulcanized state may be added to it. Into this solution the wet sheets are dipped for a brief time, say about 30 seconds, the excess is pressed off and the sheets which are still sticky are shaped to tubes by overlapping the edges. Hardening is accomplished with a solution of formaldehyde up to 30% with an addition of chromium salt. Thereafter the tubes or casings are dried and may be made soft and pliable by a treatment with ethylene glycol. The resulting product may be described as a translucent, membrane-like material, permeable to water, solutes and gases, tending to swell in water while retaining its tensile strength.

What I claim as my invention and desire to be protected by Letters Patent is:

1. A process of producing a translucent membrane-like material, permeable to water, solutes and gases, tending to swell in water while retaining its tensile strength and adapted to be used for making substitute sausage casings, which process consists in thoroughly impregnating a strong and water resisting paper with an aqueous solution of sulfonated organic compounds, dipping the paper while still wet with said solution into an aqueous solution of proteids to which a small proportion of rubber latex has been admixed and hardening thereafter the paper thus treated by means of a chemical hardening agent.

2. A process of producing a translucent membrane-like material, permeable to water, solutes and gases, tending to swell in water while retaining its tensile strength and adapted to be used for making substitute sausage casings, which process consists in thoroughly impregnating a strong and water resisting paper with an aqueous solution of sulfonated organic compounds, dipping the paper while still wet with said solution into an aqueous solution of proteids to which a small proportion of vulcanized rubber latex has been added, and hardening thereafter the paper thus treated by means of a chemical hardening agent.

3. A process of producing a translucent membrane-like material, permeable to water, solutes and gases, tending to swell in water while retaining its tensile strength and adapted to be used for making substitute sausage casings, which process consists in thoroughly impregnating a strong and water resisting paper with an aqueous solution of sulfonated organic compounds, dipping the paper while still wet with said solution into an aqueous solutoin of proteids to which a small proportion of a vulcanizer and rubber latex has been admixed, and hardening thereafter the paper thus treated by means of a chemical hardening agent.

4. A process of producing a translucent membrane-like material, permeable to water, solutes and gases, tending to swell in water, while retaining its tensile strength and adapted to be used for making substitute sausage casings, which process consists in thoroughly impregnating a strong and water resisting paper with an aqueous solution of sulfonated organic compounds, dipping the paper while still wet with said solution into an aqueous solution of proteids to which a small proportion of rubber latex and a vulcanizing and accelerating agent has been admixed and subjecting thereafter the material to vulcanising and hardening treatments.

OWSCHIA LAZAR JANSER.